United States Patent [19]

Sekella

[11] Patent Number: 4,609,080
[45] Date of Patent: Sep. 2, 1986

[54] SPRING ENGAGED DOUBLE CALIPER DISC BRAKE

[75] Inventor: Thomas C. Sekella, Elmira, N.Y.

[73] Assignee: Facet Enterprises, Inc., Tulsa, Okla.

[21] Appl. No.: 586,309

[22] Filed: Mar. 5, 1984

[51] Int. Cl.⁴ .............................................. F16D 65/21
[52] U.S. Cl. ..................................... 188/171; 310/77; 318/372
[58] Field of Search ...................... 188/72.3, 171, 173; 310/77, 93; 318/372

[56] References Cited

U.S. PATENT DOCUMENTS

| | | | |
|---|---|---|---|
| 2,983,339 | 5/1961 | Neff | 188/171 |
| 3,665,231 | 5/1972 | Wendler | 188/171 X |
| 3,983,971 | 10/1976 | Kawai | 188/171 |
| 4,049,089 | 9/1977 | Rundle | 188/171 |
| 4,142,610 | 3/1979 | Alexander et al. | 188/171 X |
| 4,226,307 | 10/1980 | Dorot | 188/171 X |

FOREIGN PATENT DOCUMENTS

| | | | |
|---|---|---|---|
| 2343918 | 3/1975 | Fed. Rep. of Germany | 188/171 |
| 1443294 | 5/1966 | France | 188/171 |
| 1062857 | 3/1967 | United Kingdom | 188/171 |

Primary Examiner—Bruce H. Stoner, Jr.
Assistant Examiner—Richard R. Diefendorf
Attorney, Agent, or Firm—Remy J. VanOphem

[57] ABSTRACT

A spring engaged and magnetically disengaged disc brake for engaging two opposing flat surfaces of a rotating disc such as to decelerate the rotating disc. The brake device includes a frame mounted in a fixed position relative to the rotating disc and a pair of identical brake subassemblies interposed portions of the frame and each of the opposing flat surfaces of the rotating disc. Each of the brake subassemblies includes an electromagnet fixedly interconnected with the frame, an armature interposed the electromagnet and one of the flat surfaces of the rotating disc, a spring interposed the frame and the armature to bias the armature towards the rotating disc when the electromagnet is de-energized, and a brake lining interposed the armature and the rotating disc. The frame may be formed of two magnet bodies fixedly interconnected with each other or of a single U-shaped stamping. The electromagnets for the brake subassemblies are preferably electromagnetic coils axially aligned with each other to provide an even force on both opposing surfaces of the rotating disc.

13 Claims, 11 Drawing Figures

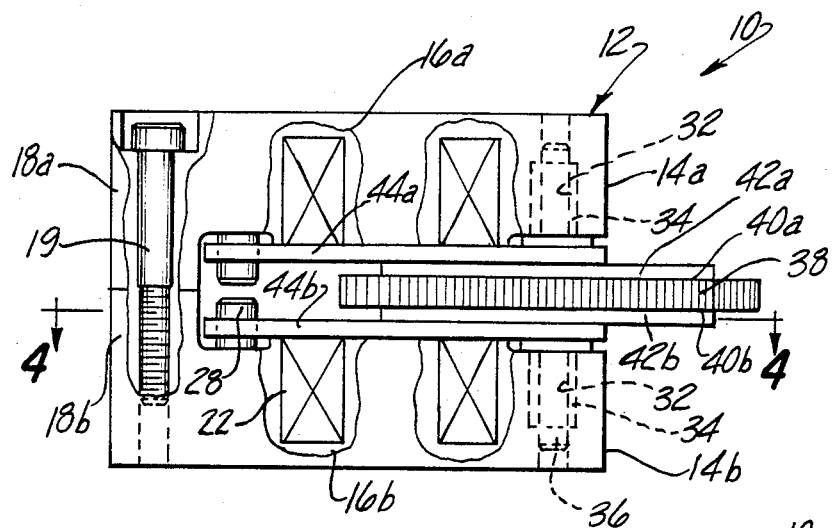
*Fig-1*
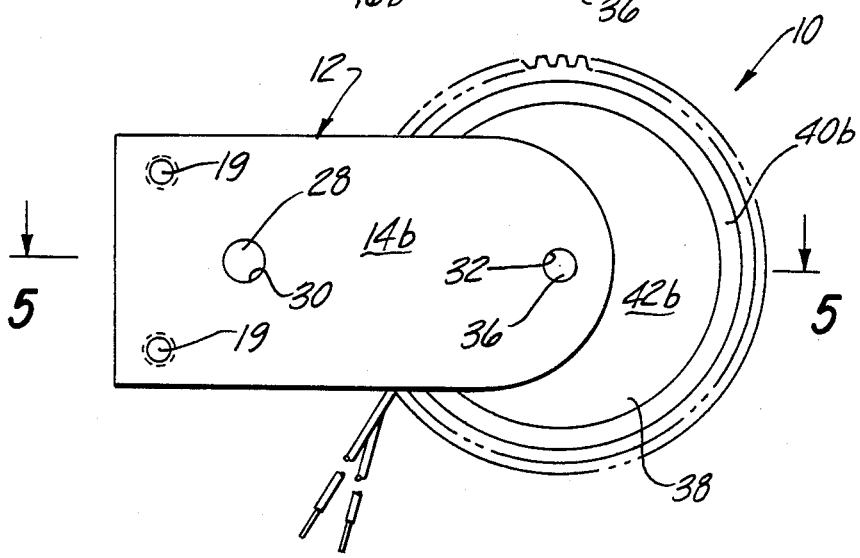
*Fig-2*
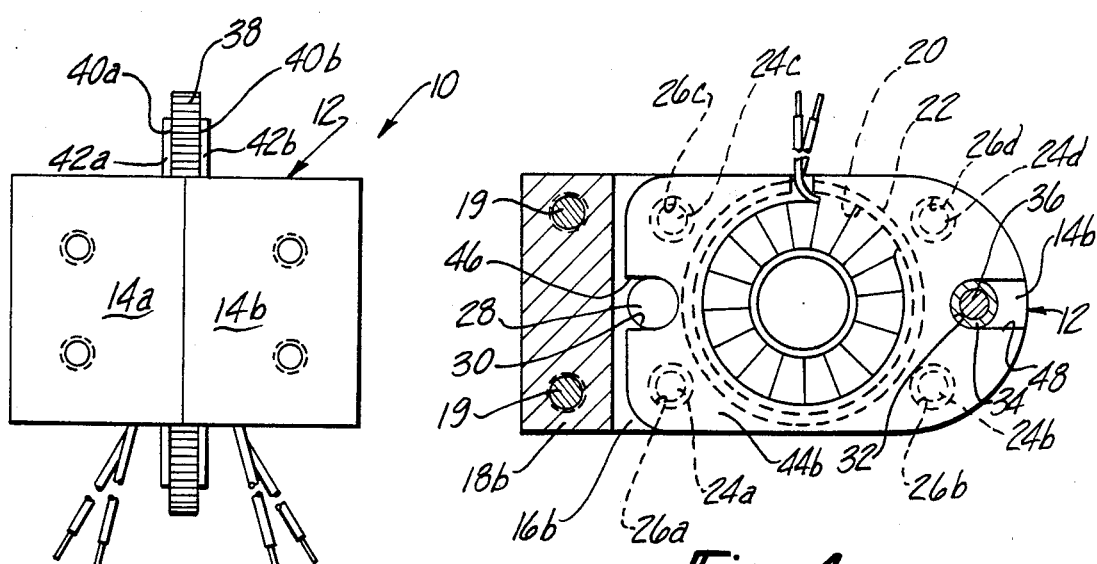
*Fig-3*
*Fig-4*

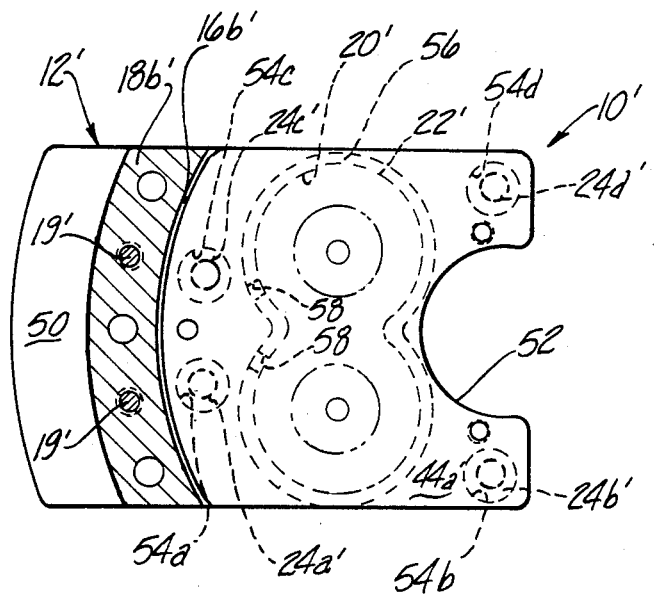
_Fig-8_
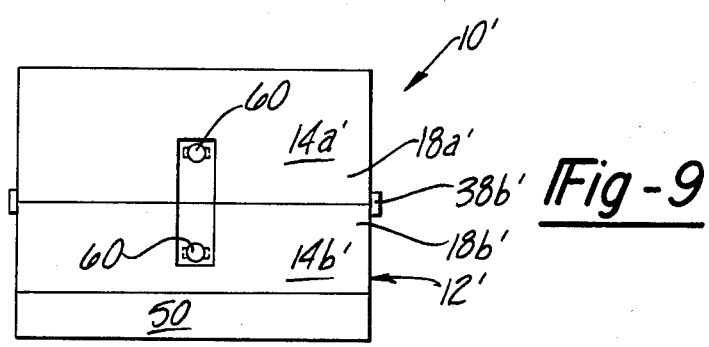
_Fig-9_
_Fig-10_
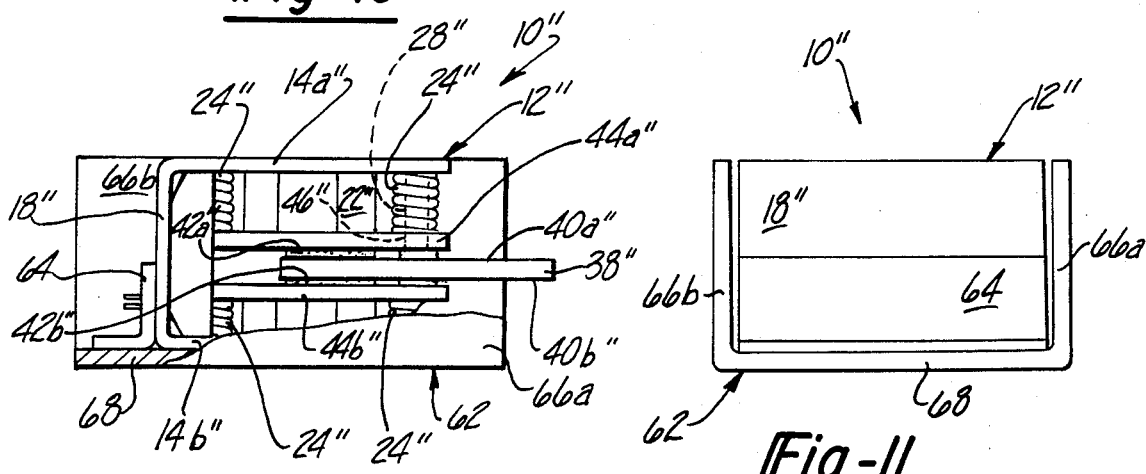
_Fig-11_

SPRING ENGAGED DOUBLE CALIPER DISC BRAKE

BACKGROUND OF THE INVENTION

The present invention relates to spring engaged double caliper disc brakes and more particularly to new, compact electromagnetically disengaged double caliper disc brakes.

There are many devices, such as computer tape drives, windmills, and computer aided tomographic scanners, that require brakes for absorbing substantial amounts of energy. For these purposes, however, it is often desired to have a compact brake assembly which can be adapted to fit in small areas having unusually shaped envelopes. One solution to this problem is to provide spring engaged disc brakes, since disc brakes permit reliable dissipation of substantial amounts of energy.

The typical prior art disc brake may be spring engaged and may be disengaged either by hydraulic or pneumatic means. Examples of spring engaged electromagnetically disengaged disc brakes may be found in Wendler, U.S. Pat. No. 3,665,231, issued May 23, 1972; Kawai, U.S. Pat. No. 3,983,971, issued Oct. 5, 1976; Rundle, U.S. Pat. No. 4,049,089, issued Sept. 20, 1977; Alexander, U.S. Pat. No. 4,142,610, issued Mar. 6, 1979 and Dorot, U.S. Pat. No. 4,226,307, issued Oct. 7, 1980. While electromagnetic disengaging means are desirable, particularly for use in devices not requiring hydraulic or pneumatic systems for any other purpose, they are often bulky and require constant attention to adjustment or, alternatively, must include self-adjusting features.

What is needed, therefore, is a compact and modular spring engaged electromagnetically disengaged disc brake permitting high energy dissipation.

SUMMARY OF THE INVENTION

The present invention provides a compact disc brake which is spring engaged and electromagnetically disengaged.

The disc brake of the present invention is designed to engage two opposing flat surfaces of a rotating disc so as to decelerate the rotating disc. The disc brake of the present invention includes a frame disposed in a fixed position relative to the rotating disc. The frame has two brake mounting portions, one disposed adjacent each of the two opposing flat surfaces, and interconnection means interconnecting the two brake mounting portions of the frame.

Brake subassemblies are interposed each of the brake mounting portions of the frame and the flat surface of the two opposing flat surfaces adjacent thereto. Each of the brake subassemblies include an electromagnet fixedly interconnected with the frame, an armature interposed the electromagnet and the rotating disc, a spring mechanically interposed the frame and the armature biasing the armature towards the rotating disc, and a brake lining interposed the armature and the rotating disc.

The frame may be formed from a single U-shaped stamping or, alternatively, from two magnet bodies fixedly interconnected with each other by a fastener. The armature preferably consists of a flat plate having substantially the same shape as the brake mounting portions of the frame. Pins may be fixedly interconnected with each of the brake mounting portions of the frame, the pins guiding a reciprocating motion of the armature towards and away from the rotating disc. The springs may consist of coil springs fitted into suitable partial bores in the brake mounting portions of the frame and extending therefrom into engagement with a surface of each one of the respective armatures.

For some uses, the electromagnet may consist of a pair of coils, one mounted to each of the brake mounting portions of the frame. Alternatively, for other configurations, two or more pairs of electromagnetic coils may be used.

The primary object of the present invention is to provide a compact and lightweight disc brake which is spring engaged and electromagnetically disengaged. The present invention accomplishes this result by providing a comparatively thin structure for a disc brake. The thickness of the entire disc brake of the present invention is equal to the combined thickness of the rotating disc, the armatures, the electromagnets, and the portion of the frames backing the electromagnets, plus the small distance required for displacement of the armatures into and out of engagement with the rotating disc. Furthermore, the disc brake of the present invention extends only a small predetermined distance radially of the rotating disc.

Another object of the present invention is to provide a spring engaged and electromagnetically disengaged disc brake which is of a modular design so that it may be used for various applications. The disc brake of the present invention is easily modified for different purposes by varying the diameter of the rotating disc with which it is used so as to vary the braking torque of the disc brake.

Another object of the present invention is to provide a spring engaged electromagnetically disengaged disc brake which is inexpensive to manufacture and easy to install. The present invention accomplishes this object by providing a disc brake assembly having a small number of inexpensive parts. This object of the present invention is further accomplished by providing a disc brake having both calipers mounted to a single frame so that a single operation is required for mounting both calipers to the device with which it is used. Furthermore, due to the symmetric construction of the disc brake of the present invention, no preadjustment of the device is required during installation and the brake device may be fixedly interconnected to the device with which it is used, relative to a rotating disc. The maintenance of the disc brake of the present invention is further facilitated by the symmetric construction of the disc brake, which obviates the need for any readjustment of the disc brake as a result of wear on the brake lining.

Yet another object of the present invention is to provide a spring engaged and electromagnetically disengaged disc brake providing high energy dissipation in a compact structure which is easily adapted to fit small and unusually shaped areas. The present invention accomplishes this result by providing a compact disc brake using two armatures to simultaneously engage both opposing faces of a rotating disc. The armatures take advantage of almost the entire size of the frame. The electromagnets are disposed adjacent the armatures and act directly on the armatures upon de-energization of the electromagnets to allow the springs to bias the armatures into engagement, through a frictional lining, with the rotating disc. The frame of the disc brake may be rigidly mounted to the device with which the disc brake is used and no self-adjusting feature is required for the symmetrically disposed armatures, thereby assuring that a substantial normal force is exerted by each of the armatures on the rotatng disc and further assuring a substantial rate of deceleration of the rotating disc.

These and many other objects, features and advantages of the present invention will become apparent to those skilled in the art when the following detailed description is read in conjunction with the drawings appended hereto.

BRIEF DESCRIPTION OF THE DRAWINGS

In the drawing, wherein like reference numerals refer to like components throughout:

FIG. 1 is a partially cutaway plan view of an example of a disc brake according to the present invention;

FIG. 2 is a front elevational view of the disc brake of FIG. 1;

FIG. 3 is an end view of the disc brake according to the present invention;

FIG. 4 is a sectional view taken along line 4—4 of FIG. 1;

FIG. 8 is a sectional view taken along line 8—8 of FIG. 7;

FIG. 9 is an end view of the disc brake of FIG. 6;

FIG. 10 is a partially cutaway plan view of a third example of the disc brake according to the present invention; and FIG. 11 is an end view of the disc brake of FIG. 10.

DETAILED DESCRIPTION OF THE PREFERRED EMBODIMENT

Figure 5:
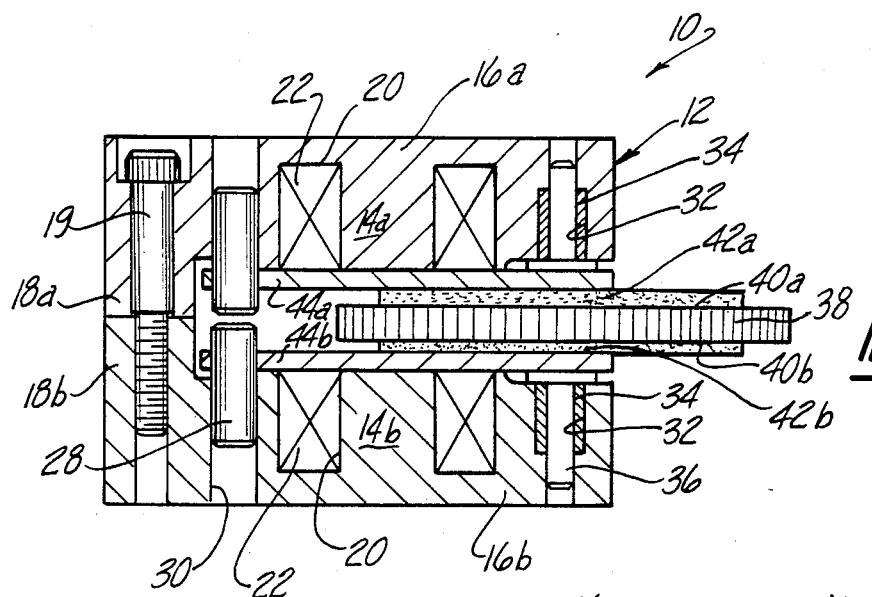
FIG. 5 is a partial sectional view taken along lines 5—5 of FIG. 2.

Referring now to the drawings, three alternate examples of disc brakes 10, 10′ and 10″, are illustrated. Each of the three examples of disc brakes according to the present invention will be described in detail below. However, it will be appreciated by those skilled in the art that these three disc brakes 10, 10′ and 10″, are merely exemplary of the present invention and not exhaustive thereof.

Referring now to FIGS. 1 through 5, a first example of a disc brake 10 according to the present invention includes a frame 12 having a first and second brake mounting portion 14a and 14b, respectively. For the disc brake 10, the first and second brake mounting portions 14a and 14b are each unitary magnet bodies having flat portions 16a and 16b, respectively, best shown in FIGS. 1 and 5, and bridge portions 18a and 18b extending normally from the flat portions 16a and 16b, respectively. The bridge portions 18a and 18b are interconnected by bolts 19 so that the first and second brake mounting portions 14a and 14b together define for the frame 12, a U-shaped configuration.

Alternatively, the frame 12 may be formed from a unitary member, not illustrated. The first and second brake mounting portions 14a and 14b are symmetrically identical and, accordingly, only the brake mounting portion 14b will be described in detail. As shown in FIG. 4, the brake mounting portion 14b is provided with an aperture 20 for the mounting therein of a magnetic coil 22. The magnetic coils 22 associated with the brake mounting portions 14a and 14b of the disc brake 10 are axially aligned with each other, as depicted in FIG. 5.

A plurality of springs 24a through 24d are partially disposed within bores 26a through 26d, as shown in FIG. 4, formed in the flat portion 16b of the brake mounting portion 14b. The bores 26a through 26d are disposed such as to partially surround the aperture 20. The bores 26a through 26d have longitudinal axes not shown, substantially parallel to the longitudinal axis of the aperture 20, also not shown.

A guide pin 28, shown in FIGS. 4 and 5, is fitted in a bore 30 through the flat portion 16b of the brake mounting portion 14b. The bore 30 is substantially parallel to the bores 26a through 26d and is disposed adjacent the bridge portion 18b of the brake mounting portion 14b. The guide pin 28 extends a short predetermind distance from the bore 30 towards the other brake mounting portion 14a, as best seen in FIG. 5. Another bore 32 is provided, parallel to the bore 30, through the flat portion 16b of the brake mounting portion 14b in a location remote from the bridge portion 18b thereof. A bearing 34 is fitted in the bore 32 for rotatably supporting one end of a shaft 36, the other end of the shaft 36 being provided in a similar bearing 34 in a similar bore 32 in the other brake mounting portion 14a, as best shown in FIG. 5.

A rotatable disc, such as a spur gear 38, is mounted to the shaft 36. The spur gear 38 has a first and second flat surface 40a and 40b, respectively, disposed adjacent the flat portions 16a and 16b of the brake mounting portions 14a and 14b of the frame. Each of the first and second flat surfaces 40a and 40b of the spur gear 38 are provided with a frictional lining 42a and 42b, respectively, as best shown in FIGS. 1, 3 and 5.

An armature plate 44a and 44b, respectively, is disposed adjacent each of the flat portions 16a and 16b of the frame 12, as shown in FIGS. 1, 4 and 5. Each of the armature plates 44a and 44b is a thin stamping formed of a magnetically permeable material. Each of the armature plates 44a and 44b has approximately the same shape as the flat portions 16a and 16b, respectively, of the frame. Each of the armature plates 44a and 44b is provided with clearance apertures for clearing the guide pin 28 and the portion of the shaft 36 associated with the flat portion 16a or 16b. For example, and as shown in FIG. 4, the clearance apertures may consist of a first slot 46 disposed adjacent the guide pin 28 and a second slot 48 disposed adjacent the shaft 36. Thus, the guide pin 28 and the shaft 36 interconnect the armature plates 44a and 44b with the frame 12 such as to be reciprocable towards and away from the frictional linings 42a and 42b of the spur gear 38. The coil springs 24a through 24d associated with each of the brake mounting portions 14a and 14b bias each respective one of the armature plates 44a and 44b against one of the frictional linings 42a and 42b of the spur gear 38. However, the electromagnetic coils 22 associated with each of the brake mounting portions 14a and 14b may be selectively actuated so as to overcome the biasing force of the coil springs 24a through 24d and disengage the armature plates 44a and 44b from the respective frictional linings 42a and 42b.

It will be readily apparent to those skilled in the art that the disc brake 10 described above is compact, lightweight, and inexpensive to manufacture, install, or maintain. Since no adjustments are required, the only required maintenance is the replacement of the frictional linings 42a and 42b. Yet, the disc brake 10 provides high energy dissipation due to the substantial contact area between the armature plates 44a and 44b, respectively, and the frictional linings 42a and 42b. This high energy dissipation is further facilitated by the fact that the frame 12 may be rigidly mounted to the device with which the disc brake is used.

Furthermore, the disc brake 10 is modular in use since the amount of torque, and therefore the rate of energy dissipation, may be varied by varying the diameter of the spur gear 38.

The disc brake 10 described above may be varied for use with discs having very large diameters by replacing the shaft 36 and the spur gear 38 with two pins, not shown in the drawing, substantially similar to the guide pins 28. The spur gear or other rotating disc may be of any desired diameter, the shaft 36 of the rotating disc being disposed remote from the frame 12. In this configuration, a plurality of disc brakes 10 may be provided for a rotating disc, each of the disc brakes 10 being disposed at different angular positions relative to the rotating disc.

Alternatively, two or more disc brakes 10 may be connected mechanically in series or in parallel with each other and with the rotating device to be stopped by mutual engagement of the teeth of the spur gears 38. Such a series or parallel interconnection of compact modular disc brakes 10 may be used so as to provide a substantial braking torque in areas where other disc brakes would not fit.

Figure 6:
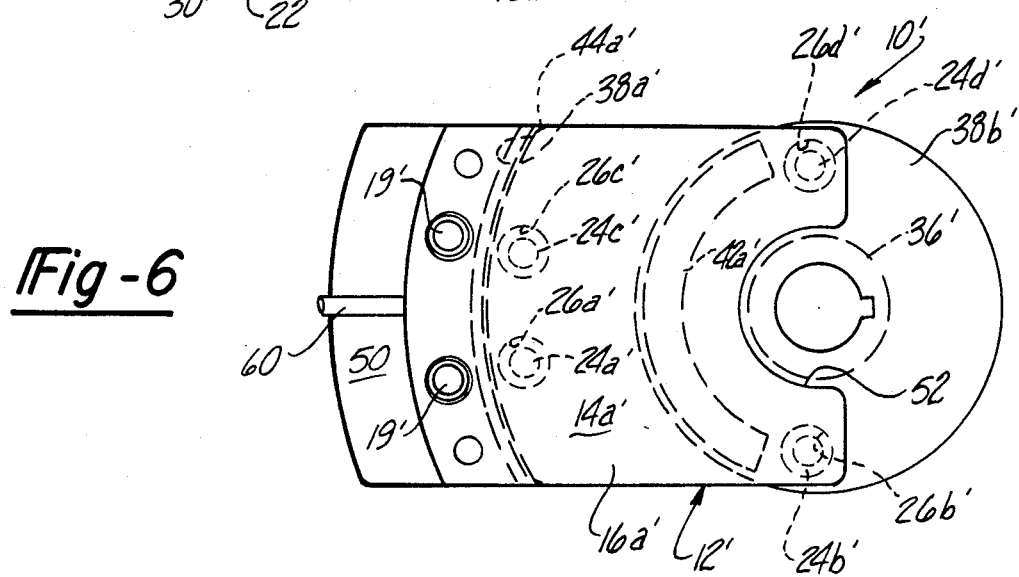
FIG. 6 is a rear elevational view of a second example of a disc brake according to the present invention.
Figure 7:
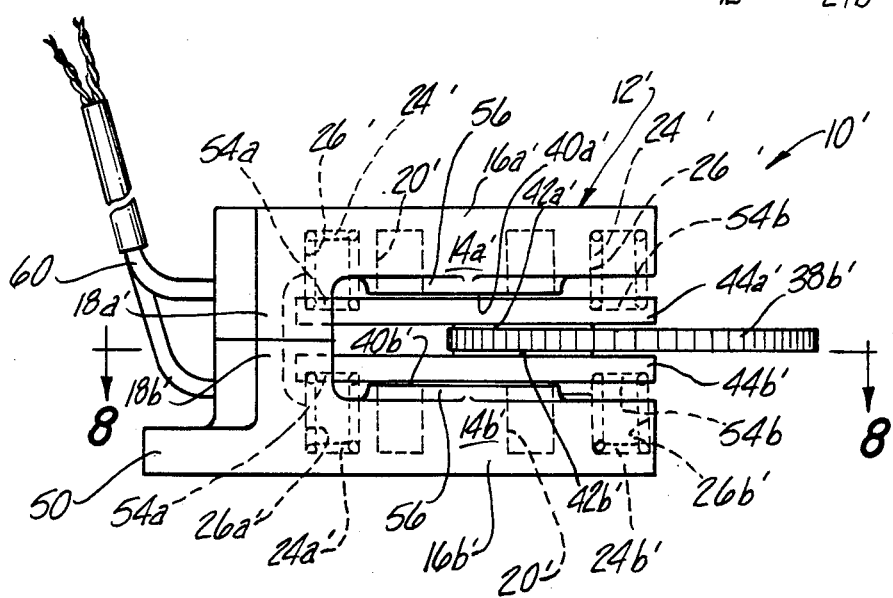
FIG. 7 is a plan view of the disc brake of FIG. 6.

Referring now to FIGS. 6 through 9, an alternate example of a disc brake 10' according to the present invention is illustrated. The disc brake 10' has a frame 12' composed of two brake mounting portions 14a' and 14b' similar to the brake mounting portions 14a and 14b described above. The brake mounting portions 14a' and 14b' are symmetrically identical to each other except that one of the brake mounting portions 14b', as best shown in FIG. 7, is provided with a flange 50 to facilitate mounting of the frame 12' to the housing, not shown, of the device with which the disc brake 10' is used. The brake mounting portions 14a' and 14b' have flat portions 16a' and 16b', respectively, and bridge portions 18a' and 18b', respectively. The bridge portions are arcuate in shape so as to accommodate a large diameter rotating disc 38a', shown in phantom line in FIG. 6. The brake mounting portions 14a' and 14b' are each unitary magnet bodies and are interconnected by means of bolts 19', as showon in FIGS. 6 and 8 to form a U-shaped structure for the frame 12'.

As with the disc brake 10 described above, the disc brake 10' may be provided with a small diameter rotating disc 38b', shown in solid line in FIGS. 6 and 7, or the large diameter rotating disc 38a', shown only in phantom line in FIG. 6, the size of the rotating disc being determined by the amount of braking torque required. The large or small diameter rotating disc 38a' or 38b', or any intermediate diameter rotating disc, is rotatably mounted to a shaft 36', shown only in FIG. 6. Unlike the shaft 36 of the disc brake 10, however, the shaft 36' is mounted independently of the mounting of the disc brake 10'. To the extent that the flat portions 16a' and 16b' of the frame 12' extend beyond the shaft 36', a clearance aperture 52, shown in FIGS. 6 and 8, is provided.

Each of the flat portions 16a' and 16b' of the frame 12' are provided with suitable apertures 20' for the mounting therein of a plurality of magnetic coils 22', as illustrated in FIG. 8. Each of the flat portions 16a' and 16b' may be provided with a suitable raised portion 56 adjacent the aperture 20', as best shown in FIG. 7, and slots 58, shown only in FIG. 8, for the passage of wires 60, shown in FIGS. 6, 7 and 9, for the electromagnetic coils 22'. Each of the raised portions 56 of the flat portions 16a' and 16b' of the frame 12' define a flat surface 40a' and 40b', respectively, for an armature plate 44a' and 44b', as best shown in FIG. 7. Each of the armature plates 44a' and 44b' are shaped substantially the same as the respective flat portions 16a' and 16b' of the frame 12'.

A plurality of coil springs 24a' through 24d' are provied in partial bores 26a' through 26d', respectively, in each of the brake mounting portions 14a' and 14b', as illustrated with respect to the brake mounting portion 14a' in FIG. 6 and as indicated generally in FIG. 7. Each of the armature plates 44a' and 44b' is provided with a plurality of pockets, such as pockets 54a through 54d, as illustrated with respect to the brake mounting portion 14b' in FIG. 8 and as generally indicated in FIG. 7, for receiving therein a portion of the coil springs 24a' through 24d'. Thus, the coil springs 24a' through 24d' bias the armature plates 44a' and 44b' towards the respective frictional linings 42a' and 42b'. Furthermore, the coil springs 24a' through 24d' reciprocably interconnect the armature plates 44a' and 44b', respectively with the flat portions 16a' and 16b' of the brake mounting portions 14a' and 14b' of the frame 12'. Thus, the coil springs 24a' through 24d' of the disc brake 10' serve two functions, corresponding to the function served by the coil springs 24a through 24d as well as the function performed by the guide pin 28 and the shaft 36 for the disc brake 10.

In the disc brake 10', frictional linings 42a' and 42b' are fixedly interconnected, for example by a suitable adhesive, with the portions of the armature plates 44a' and 44b' disposed, respectively, adjacent the flat surfaces 40a' and 40b', as shown in FIGS. 6 and 7.

In the example illustrated, the frictional linings 42a' and 42b' are arcuately shapd members engageable with a radially outward portion of the flat end surfaces of the rotating disc 38b.

It should be noted that the number and arrangement of the magnetic coils 22 and 22' used for a disc brake 10 or 10' according to the present invention will depend on the shape of the frame 12 or 12' and the armature plates 44a and 44b or 44a' and 44b, so as to provide an evenly distributed force on the armature plates.

Referring now to FIGS. 10 and 11 still another example of a disc brake 10'' according to the present invention is illustrated in a somewhat schematic manner. The disc brake 10'' has a unitary frame 12'' formed of a U-shaped stamping. Brake mounting portions 14a'' and 14b'' are formed from the frame 12'' and a bridge portion 18'' is formed therebetween. Magnetic coils 22'' are fixedly mounted, by suitable means, not illustrated, to each of the brake mounting portions 14a'' and 14b'' such that the longitudinal axis of the magnetic coils 22'' will be mutually axially aligned.

As shown in FIGS. 10 and 11, a sheet metal mounting plate 62 and a sheet metal flange member 64 are interconnected with the unitary frame 12'' for interconnecting the unitary frame with the device, not shown, with which the disc brake 10'' is used.

The sheet metal mounting plate 62 is formed into a U-shaped stamping having a pair of side portions 66a and 66b and a web portion 68. The web portion 68 is disposed parallel to the brake mounting portion 14b'' and is interconnected therewith. The side portions 66a and 66b cooperate with the brake mounting portions 14a" and 14b" of the unitary frame 12" to form a housing for the disc brake 10".

A plurality of pins 28" are interconnected, for example by welds, to each of the brake mounting portions 14a" and 14b" of the disc brake 10". As shown in FIG. 10, a plurality of coil springs 24" are mounted to the periphery of the pins 28". Armature plates 44a" and 44b" are disposed adjacent opposing respective flat surfaces 40a" and 40b" of a rotating disc 38", each of the armature plates 44a" and 44b" being provided with suitable apertures 46" for passage therethrough of the pins 28". Furthermore, each of the armature plates 44a" and 44b" is provided with frictional linings 42a" and 42b", respectively, for engagement with the flat surfaces 40a" and 40b" of the rotating disc 38".

The pins 28" guide the armature plates 44a" and 44b" for selective reciprocation towards and away from the rotating disc 38". The coil springs 24" bias the armature plates 44a" and 44b" towards the rotating disc 38" so as to exert a braking torque on the rotating disc. The magnetic coils 22" are selectively energized to overcome the biasing force of the coil springs 24" and bias the armature plates 44a" and 44b" away from engagement with the rotating disc 38".

The above detailed description includes the best mode contemplated by the inventor at the time of filing for carrying out the present invention. Many variations and modifications therefrom will be apparent to those skilled in the art, and are included within the spirit of the present invention and within the intended scope of the claims appended hereto.

What is claimed as novel is as follows:

1. A brake device for engaging two opposing flat surfaces of a rotating disc such as to decelerate said rotating disc, said brake device comprising:

frame means disposed in a fixed position relative to said rotating disc, said frame means comprising:
  a first frame portion disposed adjacent a first flat surface of said two opposing flat surfaces and spaced a predetermined distance away therefrom, said first frame portion of said frame means comprising a first flat magnet body, said first flat magnet body being disposed parallel to said first flat surface, said first flat magnet body further comprising a first bridge portion disposed remote from said first flat surface;
  a second frame portion disposed adjacent a second flat surface of said two opposing flat surfaces, said second frame portion being spaced a predetermined distance away from said second flat surface, said second frame portion of said frame means comprising a second flat magnet body, said second flat magnet body being disposed parallel to said second flat surface, said second flat magnet body having a second bridge portion disposed remote from said second flat surface; and
  interconnection means interconnecting said first and second frame portions of said frame means, said interconnection means comprising a fastener fixedly interconnecting said first and second bridge portions;

first brake means interposed said first frame portion of said frame means and said first flat surface, said first brake means comprising:
  first electromagnet means fixedly interconnected with said first frame portion of said frame means;
  first armature means interposed said first electromagnet means and said first flat surface, said first armature means being movably interconnected with said first frame portion of said frame means, such as to be movable towards and away from said first flat surface of said rotating disc, said first electromagnet means being selectively operable to bias said first armature means away from said first flat surface;
  first spring means mechanically interposed said first frame portion of said frame means and said first armature means, said first spring means exerting a biasing force therebetween to bias said first armature means towards said first flat surface when said first electromagnet means is not selectively operated; and
  first brake lining means interposed said first armature means and said first flat surface such that when said first electromagnetic means is not energized said first brake lining means decelerates said rotating disc when said first armature means is biased by said first spring means towards said first flat surface; and second brake means interposed said second frame portion of said frame means and said second flat surface of said rotating disc, said second brake means comprising:
  second electromagnet means fixedly interconnected with said second frame portion of said frame means;
  second armature means interposed said second electromagnet means and said second flat surface, said second armature means being movably interconnected with said second frame portion of said frame means, such as to be movable towards and away from said second flat surface of said rotating disc, said second electromagnet means being selectively operable to bias said second armature means away from said second flat surface;
  second spring means mechanically interposed said second frame portion of said frame means and said second armature means, said second spring means exerting a biasing force therebetween to bias said second armature means towards said second flat surface when said second electromagnet means is not selectively operated;
  second brake lining means interposed said second armature means and said second flat surface such that said second brake lining means decelerates said rotating disc when said second armature means is biased by said second spring means towards said second flat surface;
  at least one bore extending normally into said first flat magnet body;
  first guide pin means fitted partially into said at least one bore and extending therefrom in a direction towards said first flat surface, said first guide pin means movably interconnecting said first armature means with said first electromagnet means;
  at least one clearance aperture formed in said first armature means, said first guide pin means guiding said first armature means freely through said at least one clearance aperture in said first armature means as said first armature means moves towards and away from said first frame portion upon energization and de-energization of said first electromagnet means;

at least one bore extending normally into said second magnet body;

second guide pin means fitted partially into said at least one bore and extending therefrom in a direction towards said second flat surface, said second guide pin means movably interconnecting said second armature means with said second electromagnet means; and at least one clearance aperture formed in said second armature means, said second guide pin means guiding said second armature means freely through said at least one clearance aperture in said second armature means as said second armature means moves towards and away from said second frame portion upon energization and de-energization of said second electromagnet means.

2. The brake device of claim 1 wherein:

said first frame portion of said frame means comprises a first circular cavity therein, said first circular cavity having a longitudinal axis disposed normal to said first flat surface, said first circular cavity further opening towards said first flat surface of said rotating disc;

said first electromagnet means comprises a first magnetic coil fitted in said first circular cavity;

said second frame portion of said frame comprises a second circular cavity therein, said second circular cavity having a longitudinal axis disposed normal to said second flat surface, said second circular cavity; further opening towards said second flat surface of said rotating disc; and said second electromagnet means comprises a second magnetic coil fitted in said second circular cavity.

3. The brake device of claim 2 wherein said first frame portion of said frame means further comprises a first raised portion disposed adjacent said first circular cavity, said first raised portion surrounding said first circular cavity, said first raised portion of said frame means further comprising first passage means formed in said first raised portion for passsage therethrough of an electric wire for selectively supplying electrical energy to said first magnetic coil to selectively energize said first magnetic coil; and said second frame portion of said frame means further comprises a second raised portion disposed adjacent said second circular cavity, said second raised portion surrounding said second circular cavity, said second raised portion of said frame means further comprising second passage means formed in said second raised portion for passage therethrough of an electric wire for selectively supplying electrical energy to said second magnetic coil to selectively energize said second magnetic coil.

4. The brake device of claim 1 wherein said first armature means comprises a flat plate of magnetically permeable material, said flat plate of magnetically permeable material being parallel to said first flat surface; and said second armature means comprises a second flat plate of magnetically permeable material, said second flat plate of magnetically permeable material being parallel to said second flat surface.

5. The brake device of claim 1 wherein said first and second brake lining means are respectively interconnected with said first and second armature means.

6. The brake device of claim 1 wherein said first and second brake lining means are respectively interconnected with said first and second flat surfaces.

7. The brake device of claim 1 wherein:

said first electromagnet means comprises a first plurality of electromagnetic coils interconnected with said first portion of said frame means, each of said first plurality of electromagnetic coils having a longitudinal axis normal to said first flat surface; and said second electromagnet means comprises a second plurality of electromagnetic coils interconnected with said second portion of said frame means, each of said second plurality of electromagnetic coils having a longitudinal axis aligned with the longitudinal axis of a respective one of said first plurality of electromagnetic coils.

8. The brake device of claim 1 further comprising:

a shaft having a first end interconnected with said first portion of said frame means and a second end interconnected with said second portion of said frame means, said rotating disc being rotatably mounted to an intermediate portion of said shaft at a location between said first and second ends thereof.

9. The brake device of claim 1 further comprising:

a shaft having a first end interconnected with said first magnet body and a second end interconnected with said second magnet body, said rotating disc being rotatably mounted to an intermediate portion of said shaft between said first and second ends.

10. The brake device of claim 1 wherein said first guide pin means comprises a shaft having a first end fitted into said at least one bore and extending normally into said first magnet body, said shaft further having a second end fitted into said at least one bore and extending normally into said second flat magnet body, said rotating disc being rotatably mounted to said shaft; and wherein said second guide pin means comprises a first guide pin mounted into another bore of said at least one bore extending normally into said first flat magnet body, and said second guide pin means further comprises a first guide pin mounted into another bore of said at least one bore extending normally into said second flat magnet body, such that said first and second armature means are freely guided by said first and second guide pin means as said first and second armature means moves towards and away from said first and second electromagnet means, respectively.

11. A brake device for engaging two opposing flat surfaces of a rotating disc, such as to decelerate said rotating disc, said brake device comprising:

frame means comprising a U-shaped unitary stamping member disposed in a fixed position relative to said rotating disc, said U-shaped unitary member comprising:

a first frame portion disposed adjacent a first flat surface of said two opposing flat surfaces and spaced a predetermined distance away therefrom, said first frame portion of said U-shaped unitary member comprising a first flat magnet body, said first flat magnet body being disposed parallel to said flat surface, said first flat magnet body further comprising a first bridge portion disposed remote from said first flat surface;

a second frame portion disposed adjacent a second flat surface of said two opposing flat surfaces, said second frame portion being spaced a predetermined distance away from said second flat surface, said second frame portion of said U-shaped unitary member comprising a second flat magnet body, said second flat magnet body being disposed parallel to said second flat surface, said second flat magnet body having a second bridge portion disposed remote from said second flat surface; and interconnection means interconnecting said first and second frame portions of said U-shaped unitary member, said interconnection means comprising an intermediate portion of said U-shaped unitary member defining said first and second bridge portions;

first brake means interposed said first portion of said U-shaped unitary member and said first flat surface, said first brake means comprising:

first electromagnet means fixedly interconnected with said first frame portion of said U-shaped unitary member;

first armature means interposed said first electromagnet means and said first flat surface, said first armature means being movably interconnected with said first frame portion of said U-shaped unitary member, such as to be movable towards and away from said first flat surface of said rotating disc, said first electromagnet means being selectively operable to bias said first armature means away from said first flat surface;

a plurality of spaced apart first bores extending normally into said first flat magnet body;

a first plurality of springs fitted partially into said plurality of spaced apart first bores and extending into engagement with said first armature means, said first plurality of springs exerting a biasing force against said first armature means to bias said first armature means towards said first flat surface when said first electromagnet means is not selectively operated, said first plurality of springs further movably interconnecting said first armature means with said first electromagnet means; and first brake lining means interposed said first armature means and said first flat surface such that when said first electromagnet means is not energized said first brake lining means decelerates said rotating disc when said first armature means is biased by said first plurality of spring means towards said first flat surface; and second brake means interposed said second frame portion of said U-shaped unitary member and said second flat surface of said rotating disc, said second brake means comprising:

second electromagnet means fixedly interconnected with said second frame portion of said U-shaped unitary member;

second armature means interposed said second electromagnet means and said second flat surface, said second armature means being movably interconnected with said second frame portion of said U-shaped unitary member, such as to be movable towards and away from said second flat surface of said rotating disc, said second electromagnet means being selectively operable to bias said second armature means away from said second flat surface;

a plurality of spaced apart second bores extending normally into said second flat magnet body;

a second plurality of springs fitted partially into said plurality of spaced apart second bores and extending therefrom into engagement with said second armature means, said second plurality of springs exerting a biasing force against said second armature means to bias said second armature means towards said second flat surface when said second electromagnet means is not selectively operated, said second plurality of springs further movably interconnecting said second armature means with said second electromagnet means; and second brake lining means interposed said second armature means and said second flat surface such that said second brake lining means decelerates said rotating disc when said second armature means is biased by said second plurality of springs towards said second flat surface.

12. The brake device of claim 11 wherein:

said first armature means further comprises a first plurality of pockets, each of the pockets in said first plurality of pockets removably accepting a portion of one of said first plurality of springs; and said second armature means further comprises a second plurality of pockets, each of the pockets in said second plurality of pockets removably accepting a portion of one of said second plurality of springs.

13. A brake device for engaging two opposing flat surfaces of a rotating disc such as to decelerate said rotating disc, said brake device comprising:

a first magnet body disposed in a fixed position relative to said rotating disc, said first magnet body being further disposed adjacent a first flat surface of said two opposing flat surfaces of said rotating disc;

a second magnet body disposed adjacent a second flat surface of said two opposing flat surfaces of said rotating disc, said second magnet body being spaced a predetermined distance away from said first magnet body;

interconnection means interconnecting said first and second magnet bodies;

a first circular cavity formed in said first magnet body, said first circular cavity having a longitudinal axis disposed normal to said first flat surface, said first circular cavity further opening towards said first flat surface;

a second circular cavity formed in said second magnet body, said second circular cavity having a longitudinal axis disposed normal to said second flat surface, said second circular cavity further opening towards said second flat surface;

a first electromagnetic coil disposed in said first circular cavity;

a second electromagnetic coil disposed in said second circular cavity;

a first armature plate interposed said first electromagnetic coil and said first flat surface, said first armature plate being movably interconnected with said first magnet body such as to be movable towards and away from said first flat surface of said rotating disc, said first electromagnetic coil being selectively operable to bias first armature plate away from said first flat surface;

a first plurality of bores extending normally into said first magnet body;

a first plurality of pin means fitted partially into said first plurality of bores and extending therefrom in a direction towards said first flat surface;

a first plurality of clearance apertures formed in said first armature plate, said first plurality of pin means passing freely through said first plurality of clearance apertures;

a second armature plate interposed said second electromagnetic coil and said second flat surface, said second armature plate being movably interconnected with said second magnet body such as to be movable towards and away from said second flat surface of said rotating disc, said second electromagnetic coil being selectively operable to bias said second armature plate away from said second flat surface;

a second plurality of bores extending normally into said second magnet body;

a second plurality of pin means fitted partially into said second plurality of bores and extending therefrom in a direction towards said second flat surface;

a second plurality of clearance apertures formed in said second armature plate, said second plurality of pin means passing freely through said second plurality of clearance apertures;

first spring means mechanically interposed said first magnet body and said first armature plate, said first spring means exerting a biasing force therebetween such as to bias said first armature plate towards said first flat surface when said first electromagnetic coil is not selectively energized;

second spring means mechanically interposed said second magnet body and said second armature plate, said second spring means exerting a biasing force therebetween such as to bias said second armature plate towards said second flat surface when said second electromagnetic coil is not selectively energized;

first brake lining means interposed said first armature plate and said first flat surface such that said first brake lining means decelerates said rotating disc when said first armature plate is biased by said first spring means towards said first flat surface; and second brake lining means interposed said second armature plate and said second flat surface such that said second brake lining means decelerates said rotating disc when said second armature plate is biased by said second spring means towards said second flat surface.

* * * * *

UNITED STATES PATENT AND TRADEMARK OFFICE
CERTIFICATE OF CORRECTION

PATENT NO. : 4,609,080
DATED : September 2, 1986
INVENTOR(S) : Thomas Curran Sekella It is certified that error appears in the above-identified patent and that said Letters Patent is hereby corrected as shown below:

Column 5, line 48, delete "showon" and insert ---- shown ----.

Column 6, line 40, delete "shapd" and insert ---- shaped ----.

Column 6, line 47, delete "44b" and insert ---- 44b' ----.(2nd. occ.)

Column 6, line 49, after "11" insert a comma ---- , ----.

Column 9, line 29, delete "cavity;" and insert ---- cavity ----.

Column 11, line 41, delete "spring means" and insert ---- springs ----.

Column 12, line 53, after "bias" insert ---- said ----.

Signed and Sealed this

Twenty-fourth Day of February, 1987

Attest:

DONALD J. QUIGG

Attesting Officer

Commissioner of Patents and Trademarks